(12) United States Patent
Su et al.

(10) Patent No.: US 11,470,348 B2
(45) Date of Patent: Oct. 11, 2022

(54) METHODS AND APPARATUSES OF VIDEO PROCESSING WITH BI-DIRECTION PREDICTION IN VIDEO CODING SYSTEMS (71) Applicant: MEDIATEK INC., Hsinchu (TW)

(72) Inventors: Yu-Chi Su, Hsinchu (TW); Ching-Yeh Chen, Hsinchu (TW); Yu-Wen Huang, Hsinchu (TW); Tzu-Der Chuang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/265,976

(22) PCT Filed: Aug. 16, 2019

(86) PCT No.: PCT/CN2019/101011
§ 371 (c)(1),
(2) Date: Feb. 4, 2021

(87) PCT Pub. No.: WO2020/035054
PCT Pub. Date: Feb. 20, 2020

(65) Prior Publication Data
US 2021/0266595 A1  Aug. 26, 2021

Related U.S. Application Data (60) Provisional application No. 62/738,034, filed on Sep. 28, 2018, provisional application No. 62/719,186, filed on Aug. 17, 2018.

(51) Int. Cl.
*H04N 19/577* (2014.01)
*H04N 19/176* (2014.01)
(Continued)

(52) U.S. Cl.
CPC ......... *H04N 19/577* (2014.11); *H04N 19/105* (2014.11); *H04N 19/176* (2014.11); *H04N 19/52* (2014.11); *H04N 19/70* (2014.11)

(58) Field of Classification Search
CPC .. H04N 19/577; H04N 19/105; H04N 19/176; H04N 19/52; H04N 19/70
See application file for complete search history.

(56) References Cited

U.S. PATENT DOCUMENTS 10,798,385 B2   10/2020 Lee
2010/0091846 A1* 4/2010 Suzuki ................ H04N 19/139
                                                375/240.12
(Continued)

FOREIGN PATENT DOCUMENTS

CN      102934444 A    2/2013
CN      107925775 A    4/2018
(Continued)

OTHER PUBLICATIONS

International Search Report and Written Opinion dated Oct. 28, 2019, issued in application No. PCT/CN2019/101011.
(Continued)

*Primary Examiner* — Anner N Holder
(74) *Attorney, Agent, or Firm* — Oblon, McClelland, Maier & Neustadt, L.L.P.

(57) ABSTRACT

Exemplary video processing methods and apparatuses for encoding or decoding a current block by bi-directional prediction. Multiple weight sets are utilized for blending List 0 and List 1 predictors, and the selection among multiple weight sets may be implicitly determined based on video information. Each weight set is composed of multiple candidate weights, and one candidate weight is selected for the current block. A weight pair associated with the selected weight for the current block is used for weighted averaging List 0 and List 1 predictors of the current block to generate
(Continued)

a final inter predictor. The video processing methods and apparatuses encode or decode the current block according to the final inter predictor of the current block.

21 Claims, 6 Drawing Sheets

(51) Int. Cl.
*H04N 19/105* (2014.01)
*H04N 19/70* (2014.01)
*H04N 19/52* (2014.01)

(56) References Cited

U.S. PATENT DOCUMENTS

| | | | |
|---|---|---|---|
| 2011/0007803 A1* | 1/2011 | Karczewicz | H04N 19/19 375/240.15 |
| 2013/0083851 A1 | 4/2013 | Alshin et al. | |
| 2016/0029035 A1* | 1/2016 | Nguyen | H04N 19/597 375/240.12 |
| 2017/0085917 A1* | 3/2017 | Hannuksela | H04N 19/523 |
| 2017/0094305 A1 | 3/2017 | Li et al. | |
| 2018/0098070 A1* | 4/2018 | Chuang | H04N 19/137 |
| 2018/0184117 A1* | 6/2018 | Chen | H04N 19/109 |
| 2018/0249172 A1 | 8/2018 | Chen et al. | |
| 2018/0262773 A1* | 9/2018 | Chuang | H04N 19/00 |
| 2018/0295385 A1* | 10/2018 | Alshin | H04N 19/176 |
| 2018/0332298 A1* | 11/2018 | Liu | H04N 19/105 |
| 2019/0045214 A1 | 2/2019 | Ikai et al. | |
| 2019/0200040 A1* | 6/2019 | Lim | H04N 19/583 |
| 2019/0215521 A1 | 7/2019 | Chuang et al. | |
| 2019/0230350 A1* | 7/2019 | Chen | H04N 19/573 |
| 2019/0320199 A1 | 10/2019 | Chen et al. | |
| 2020/0053364 A1* | 2/2020 | Seo | H04N 19/70 |
| 2020/0053387 A1 | 2/2020 | Lee | |
| 2020/0221122 A1 | 7/2020 | Ye et al. | |
| 2020/0267383 A1* | 8/2020 | Jun | H04N 19/119 |
| 2020/0351495 A1 | 11/2020 | Li et al. | |
| 2020/0366928 A1* | 11/2020 | Liu | H04N 19/52 |
| 2021/0127133 A1 | 4/2021 | Chen et al. | |

FOREIGN PATENT DOCUMENTS

| | | |
|---|---|---|
| TW | 201818723 A | 5/2018 |
| TW | 201830968 A | 8/2018 |
| WO | 2015/015058 A1 | 2/2015 |
| WO | 2017/036399 A1 | 3/2017 |
| WO | 2017/188566 A1 | 11/2017 |
| WO | 2018/044441 A1 | 3/2018 |
| WO | 2018/084339 A1 | 5/2018 |
| WO | 2018/129172 A1 | 7/2018 |

OTHER PUBLICATIONS

Su, Y.C., et al.; "CE4.4.1: Generalized bi-prediction for inter coding;" Joint Video Experts Team (JVET) of ITU-T SG 16 WP 3 and ISO/IEC JTC 1/SC 29/WG 11; Jul. 2018; pp. 1-16.
Chen, C.C., et al.; "Generalized bi-prediction for inter coding;" Joint Video Exploration Team (JVET) of ITU-T SG 16 WP 3 and ISO/IEC JTC 1/SC 29/WG 11; Jun. 2016; pp. 1-20.
Chinese language office action dated Jan. 11, 2021, issued in application No. TW 108129241.
International Search Report and Written Opinion dated Aug. 29, 2019, issued in application No. PCT/CN2019/090560.
Chinese language office action dated Jun. 20, 2020, issued in application No. TW 108120033
Notice of Allowance dated Jun. 10, 2010, issued in application No. U.S. Appl. No. 17/251,008 (copy not provided).

* cited by examiner

METHODS AND APPARATUSES OF VIDEO PROCESSING WITH BI-DIRECTION PREDICTION IN VIDEO CODING SYSTEMS

CROSS REFERENCE TO RELATED APPLICATION

The present invention claims priority to U.S. Provisional Patent Application Ser. No. 62/719,186, filed on Aug. 17, 2018, entitled "BIO Bitwidth Reduction and Interaction with Generalized Bi-Prediction (GBi)", and U.S. Provisional Patent Application Ser. No. 62/738,034, filed on Sep. 28, 2018, entitled "GBi Improvement" The two U.S. Provisional Patent Applications are hereby incorporated by reference in their entireties.

FIELD OF THE INVENTION

The present invention relates to video processing methods and apparatuses in video encoding and decoding systems. In particular, the present invention relates to encoding or decoding video data by bi-directional prediction in inter picture prediction.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. An up-coming video standard called Versatile Video Coding (VVC) is targeting at a new generation of video compression technology that has substantially higher compression capability than the HEVC standard. Three categories of video are addressed in the VVC standard, which are Standard Dynamic Range video (SDR), High Dynamic Range video (HDR), and 360° video. Many coding tools were proposed during the development of the VVC standard to improve the video compression efficiency, some coding tools related to bi-directional prediction applied in inter picture prediction include Bi-prediction with CU Weights (BCW) and Bi-Directional Optical flow (BDOF).

Bi-prediction with CU Weight (BCW) BCW is also known as Generalized Bi-prediction (GBi), which is a coding tool proposed to increase the video compression gain by allowing different weights for combining the List 0 predictor and the List 1 predictor in bi-directional prediction, instead of using equal weights as in traditional bi-directional prediction. BCW computes a final inter predictor of a bi-directional predicted block as a weighted average of two predictors derived by performing motion compensation from two reference pictures. The weights of the two predictors may be adaptively determined. The final inter predictor $P_{TraditionalBiPred}$ generated by the traditional bi-directional prediction is shown in Equation 1 and the final inter predictor $P_{GBi}$ generated by BCW is shown in Equation 2.

$$P_{TraditionalBiPred}=(P_{L0}+P_{L1}+\text{RoundingOffset})>>\text{shiftNum} \quad \text{Equation 1}$$

$$P_{GBi}=(w_0*P_{L0}+w_1*P_{L1}+\text{RoundingOffset}_{GBi})>>\text{shiftNum}_{GBi} \quad \text{Equation 2}$$

According to Equation 2, the List 0 predictor $P_{L0}$ and the List 1 predictor $P_{L1}$ are weighted by selected weights $w_0$ and $w_1$ respectively before blending. RoundingOffset, shiftNum, RoundingOffset$_{GBi}$, and shiftNum$_{GBi}$ represent numbers used to normalize the bi-directional predictors in traditional bi-direction prediction and BCW respectively. The value of weight $w_1$ for List 1 predictor $P_{L1}$ is selected from a weight set, where the weight set is composed of a predefined number of candidate weights. For example, a weight set includes 7 candidate weights $\{-\frac{1}{4}, \frac{1}{4}, \frac{3}{8}, \frac{1}{2}, \frac{5}{8}, \frac{3}{4}, \frac{5}{4}\}$, and all the candidate weights are associated with unequal weight pairs except for the candidate weight $\frac{1}{2}$. An index is used to indicate the position of the selected weight $w_1$ for List 1 predictor $P_{L1}$ in the weight set. The corresponding weight $w_0$ for List 0 predictor $P_{L0}$ is derived from the selected weight $w_1$ by Equation 3 as a blending gain of the weight pair ($w_1$, $w_2$) is fixed to 1.

$$w_0=1-w_1 \quad \text{Equation 3}$$

For blocks coded by the normal inter prediction mode, also referred to as Advanced Motion Vector Prediction (AMVP) mode, the weight selection in BCW is explicitly signaled by the video encoder for each block coded by bi-directional prediction. For blocks coded by Skip or Merge mode, the weight selection in BCW is inherited from the selected Merge candidate.

Figure 1:
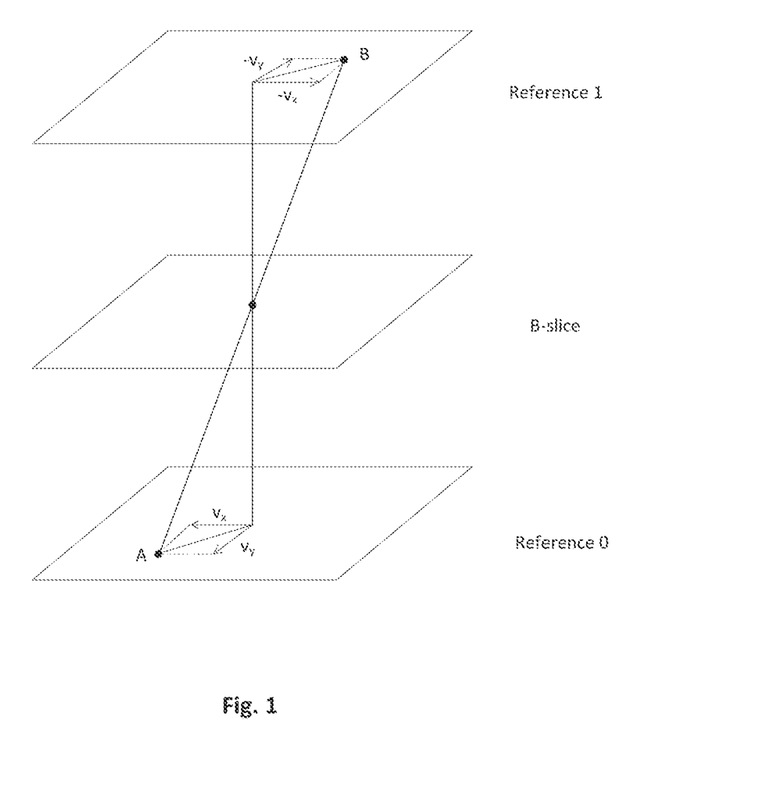
FIG. 1 illustrates an example of applying Bi-Directional Optical Flow (BDOF) for sample refinement.

Bi-Directional Optical flow (BDOF) BDOF achieves sample-level motion refinement through the assumptions of optical flow and steady motion of objects. BDOF is only applied to truly bi-directional predicted blocks, where the truly bi-directional predicted blocks are blocks in a current picture predicted from two reference pictures, one reference picture is a previous picture and the other reference picture is a latter picture. A predictor of a bi-directional predicted block is derived by blending one List 0 predictor retrieved from a reference picture of List 0 and one List 1 predictor retrieved from a reference picture of List 1. FIG. 1 illustrates an example of applying BDOF to refine one particular sample in a bi-directional predicted block in a bi-direction slice (B-slice), where this sample is predicted by corresponding pixels in two reference pictures, Reference 0 and Reference 1. BDOF employs a 5×5 window to derive the motion refinement for each sample, so for each N×N block, the motion compensated results and corresponding gradient information of a (N+4)×(N+4) block are required for deriving the sample-based motion refinement. In BDOF, a 6-Tap gradient filter and a 6-Tap interpolation filter are used to generate the gradient information. The computational complexity of BDOF is much higher than that of the traditional bi-directional prediction.

In the traditional bi-directional prediction supported by the HEVC standard, the inter predictor is generated according to the formula shown in Equation 4, in which $P^{(0)}$ and $P^{(1)}$ are corresponding List 0 and List 1 predictors respectively.

$$P_{Conventional}[i,j]=(P^{(0)}[i,j]+P^{(1)}[i,j]+1)>>1 \quad \text{Equation 4}$$

The inter predictor generated by BDOF is shown in Equation 5, where $I_x^{(0)}$ and $I_x^{(1)}$ represent a x-directional gradient in List 0 and List 1 predictors, respectively, and $I_y^{(0)}$ and $I_y^{(1)}$ represent a y-directional gradient in List 0 and List 1 predictors, respectively. The offsets in x-direction and y-direction are $v_x$ and $v_y$ respectively, and these offsets are used to refine the samples of the inter predictors as shown in FIG. 1.

$$P_{OpticalFlow}=(P^{(0)}[i,j]+P^{(1)}[i,j]+$$
$$+v_x[i,j](I_x^{(0)}-I_x^{(1)}[i,j])+$$
$$+v_y[i,j](I_y^{(0)}-I_y^{(1)}[i,j])+1)>>1 \quad \text{Equation 5}$$

The x-directional and y-directional gradients can be directly derived based on interpolated results or these gradients can be calculated using another set of gradient filters and interpolation filters. One additional shift, gradient shift, is also introduced to normalize the gradient values in the derivation process of each gradient. The derivation process of the offsets $v_x$ and $v_y$ is shown in the following. First, a cost function diffCost(x, y) is defined to search for the best values for the offsets $v_x$ and $v_y$. The best values of the offsets $v_x$ and $v_y$ minimize the cost function diffCost(x, y) as shown in Equation 6, and one 5×5 window is used to derive the motion refinement. The solutions of the offsets $v_x$ and $v_y$ can be represented by using parameters $S_1$, $S_2$, $S_3$, $S_5$, and $S_6$ as shown in Equation 7.

$$diffCost(x, y) = \sum_\Omega \left( P^0(x, y) + v_x \frac{\partial P^0(x, y)}{\partial x} + v_y \frac{\partial P^0(x, y)}{\partial y} - \left( P^1(x, y) - v_x \frac{\partial P^1(x, y)}{\partial x} - v_y \frac{\partial P^1(x, y)}{\partial y} \right) \right)^2$$

$$= \sum_\Omega \left( P^0(x, y) - P^1(x, y) + v_x \left( \frac{\partial P^0(x, y)}{\partial x} + \frac{\partial P^1(x, y)}{\partial x} \right) + v_y \left( \frac{\partial P^0(x, y)}{\partial y} + \frac{\partial P^1(x, y)}{\partial y} \right) \right)^2$$

Equation 6

$$\min diffCost(x, y) \Rightarrow \frac{\partial diffCost(x, y)}{\partial v_x} = 0,$$

$$\frac{\partial diffCost(x, y)}{\partial v_y} = 0$$

$$\Rightarrow v_x = \frac{S_3 S_5 - S_2 S_6}{S_1 S_5 - S_2 S_2}, v_y = \frac{S_1 S_6 - S_3 S_2}{S_1 S_5 - S_2 S_2}$$

where $$S_1 = \sum_\Omega \left( \frac{\partial P^0(x, y)}{\partial x} + \frac{\partial P^1(x, y)}{\partial x} \right)^2,$$

Equation 7

$$S_2 = \sum_\Omega \left( \frac{\partial P^0(x, y)}{\partial x} + \frac{\partial P^1(x, y)}{\partial x} \right)\left( \frac{\partial P^0(x, y)}{\partial y} + \frac{\partial P^1(x, y)}{\partial y} \right)$$

$$S_3 = -\sum_\Omega \left( \frac{\partial P^0(x, y)}{\partial x} + \frac{\partial P^1(x, y)}{\partial x} \right)(P^0(x, y) - P^1(x, y)),$$

$$S_5 = \sum_\Omega \left( \frac{\partial P^0(x, y)}{\partial y} + \frac{\partial P^1(x, y)}{\partial y} \right)^2$$

$$S_6 = -\sum_\Omega \left( \frac{\partial P^0(x, y)}{\partial y} + \frac{\partial P^1(x, y)}{\partial y} \right)(P^0(x, y) - P^1(x, y))$$

The formulas for calculating the offsets $V_x$ and $V_y$ can be further simplified according to Equation 8.

$$\Rightarrow v_x = \frac{S_3}{S_1}, v_y = \frac{S_6 - v_x S_2}{S_5}$$

Equation 8 where $$S_1 = \sum_\Omega \left( \frac{\partial P^0(x, y)}{\partial x} + \frac{\partial P^1(x, y)}{\partial x} \right)^2,$$

$$S_2 = \sum_\Omega \left( \frac{\partial P^0(x, y)}{\partial x} + \frac{\partial P^1(x, y)}{\partial x} \right)\left( \frac{\partial P^0(x, y)}{\partial y} + \frac{\partial P^1(x, y)}{\partial y} \right)$$

$$S_3 = -\sum_\Omega \left( \frac{\partial P^0(x, y)}{\partial x} + \frac{\partial P^1(x, y)}{\partial x} \right)(P^0(x, y) - P^1(x, y)),$$

$$S_5 = \sum_\Omega \left( \frac{\partial P^0(x, y)}{\partial y} + \frac{\partial P^1(x, y)}{\partial y} \right)^2$$

$$S_6 = -\sum_\Omega \left( \frac{\partial P^0(x, y)}{\partial y} + \frac{\partial P^1(x, y)}{\partial y} \right)(P^0(x, y) - P^1(x, y))$$

It is observed that the required bitdepth in the BDOF process is relatively large, especially for calculating the five parameters $S_1$, $S_2$, $S_3$, $S_5$, and $S_6$. In an example, the bitdepth of a pixel value in video sequences is 10 bits, and the bitdepth of the gradients is increased by the fractional interpolation filter or gradient filter, for example, the bitdepth required to represent one x-directional gradient or one y-directional gradient is 15 bits. These 15 bits may be reduced by gradient shifting, for example, one gradient value is represented by 11 bits after the four bits gradient shift. Even if the magnitude of the gradient is reduced to 11 bits by using gradient shift, the required bitdepth for the BDOF operations is still large. One multiplier with 12 bits by 12 bits is required to calculate the parameters $S_1$, $S_2$, and $S_5$, while another multiplier with 12 bits by 15 bits is required to calculate the parameters $S_3$ and $S_6$. More than 32 bits are required to represent the parameters $S_3$ and $S_6$ when the window size is relatively large.

Skip and Merge Skip and Merge modes increase the coding efficiency in inter picture prediction as motion information is inherited from spatially neighboring blocks or a temporally collocated block. To code a block in Skip or Merge mode, instead of signaling motion information, only an index representing a final Merge candidate selected from a candidate set is signaled. The motion information reused by the block coded in Skip or Merge mode includes a motion vector (MV), an inter prediction indicator, and a reference picture index of the selected final candidate. It is noted that if the selected final candidate is a temporal motion candidate, the reference picture index is always set to zero. Prediction residual is coded when the block is coded in Merge mode, however, the Skip mode further skips signaling of the prediction residual as the residual data of a block coded in Skip mode is forced to be zero.

Figure 2:
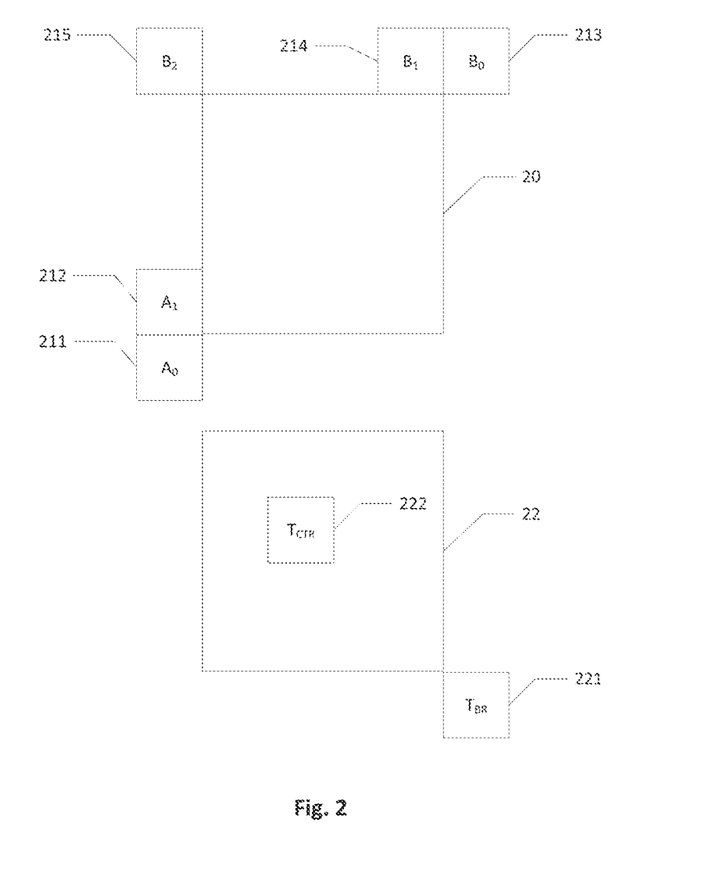
FIG. 2 illustrates locations of spatial motion candidates and temporal motion candidate for constructing a Merge candidate sets defined in the HEVC standard.

A Merge candidate set in the HEVC standard for a current Prediction Unit (PU) 20 coded in Skip or Merge mode consists of four spatial motion candidates associated with neighboring blocks of the current PU 20 and one temporal motion candidate associated with a collocated PU 22 of the current PU 20. As shown in FIG. 2, the first Merge candidate is a left predictor $A_1$ 212, the second Merge candidate is a top predictor $B_1$ 214, the third Merge candidate is a right above predictor $B_0$ 213, and a fourth Merge candidate is a left below predictor $A_0$ 211. A left above predictor $B_2$ 215 is included in the Merge candidate set to replace an unavailable spatial predictor. A fifth Merge candidate is a temporal predictor of first available temporal predictors $T_{BR}$ 221 and $T_{CTR}$ 222. The encoder selects one final candidate from the candidate set for each PU coded in Skip or Merge mode based on motion vector compensation such as through a Rate-Distortion Optimization (RDO) decision, and an index representing the selected final candidate is signaled to the decoder. The decoder selects the same final candidate from the candidate set according to the index transmitted in the video bitstream. Since the derivations of Skip and Merge candidates are similar, the "Merge" mode referred hereafter may correspond to Merge mode as well as Skip mode for convenience.

Local Illumination Compensation (LIC) LIC is a coding tool which performs inter picture prediction using neighboring samples of current and reference blocks to reduce the illumination fluctuation from one picture to another. It is based on a linear model using a scaling factor a and an offset b. The scaling factor a and offset b are derived by referring to neighboring samples of the current block and reference block. LIC is enabled or disabled adaptively for each CU.

BRIEF SUMMARY OF THE INVENTION

Exemplary methods of video processing in a video coding system perform bi-directional motion compensation to encode or decode video blocks. An exemplary video processing method receives input video data associated with a current block in a current picture, and determines a List 0 predictor for the current block by performing motion compensation from a reference picture in List 0 and a List 1 predictor for the current block by performing motion compensation from a reference picture in List 1. One out of multiple weight sets is selected for processing the current block according to embodiments of the present invention. Each weight set is composed of a number of candidate weights, and at least one candidate weight in one of the weight sets is not in another weight set. The video processing method further includes selecting a weight from the selected weight set for the current block and computing a final inter predictor by weighted averaging the List 0 predictor and the List 1 predictor using a weight pair associated with the selected weight for the current block. The current block is encoded or decoded according to the final inter predictor of the current block.

Each weight set may contain a different number of candidate weights, for example, one weight set includes five candidate weights and another weight set includes seven candidate weights. In some embodiments of the present invention, the weight set for the current block is implicitly selected based on video information related to one or a combination of a temporal layer ID, Picture of Count (POC) difference between the current and reference pictures, low delay or non-low delay video picture, Quantization Parameter (QP), Coding Unit (CU) size, Coding Tree Unit (CTU) size, and flag indicating if a Motion Vector Difference (MVD) of List 1 is equal to zero. For example, a first weight set with five candidate weights is selected for the current block if the current picture is a low delay video picture, and a second weight set with three candidate weights is selected for the current block if the current picture is a non-low delay video picture.

A blending gain of a weight pair associated with each candidate weight is fixed to 1 in an embodiment, the weight pair includes a weight for the List 0 predictor and a weight for the List 1 predictor, and the weight for the List 1 predictor is the candidate weight and the weight for the List 0 predictor is derived by 1 minus the candidate weight. In another embodiment, the blending gain of a weight pair associated with each candidate weight is not all fixed to 1, at least one candidate weight is associated with a weight pair having weights not added up to 1 while the rest of the candidate weights are associated with weight pairs having weights added up to 1.

An embodiment of selecting a weight explicitly signals or parses an index to indicate the selected weight for the current block if the current block is coded or to be coded in Advanced Motion Vector Prediction (AMVP) mode, and implicitly determines the selected weight if the current block is coded or to be coded in Merge or Skip mode. The selected weight is inherited from a selected Merge candidate when motion information of the current block is inheriting from the selected Merge candidate.

An exemplary embodiment of the video processing method further comprises a pre-selecting process for selecting a weight for the current block in the video encoding system, the pre-selecting process skips evaluating one or more candidate weights in the selected weight set and only evaluates remaining candidate weights in the selected weight set, and the weight is selected from the remaining candidate weights according to evaluation results of the pre-selecting process. In one embodiment, an index is signaled or parsed to indicate the selected weight in the selected weight set for the current block, and the index is adaptively adjusted if one or more candidate weights in the selected weight set are skipped for evaluation in the pre-selecting process.

In some embodiments, each of the weight sets is composed of one candidate weight associated with an equal weight pair and multiple candidate weights associated with unequal weight pairs, and samples in the List 0 and List 1 predictors of the current block are refined based on bi-directional optical flow only if the selected weight is associated with the equal weight pair.

In a variation of the video processing method, exemplary embodiments enable only one of Bi-prediction with CU Weight (BCW) and Bi-Directional Optical Flow (BDOF) coding tools in bi-directional prediction. The video processing method receives input data associated with a current block, determines a List 0 predictor for the current block by performing motion compensation from a reference picture in List 0 and a List 1 predictor for the current block by performing motion compensation from a reference picture in List 1, computes a final inter predictor of the current block using the List 0 and List 1 predictors by enabling only one of the BCW and BDOF coding tools, and encodes or decodes the current block according to the final inter predictor of the current block. Different weights are allowed for blending the List 0 and List 1 predictors when the BCW coding tool is enabled, and samples of the List 0 and List 1 predictors are refined based on an optical flow theory when the BDOF coding tool is enabled. In some embodiments, the video processing method further comprises selecting a weight from a weight set for the current block, and the final inter predictor is computed by weighted averaging the List 0 and List 1 predictors using a weight pair associated with the selected weight. The weight set is composed of one candidate weight associated with an equal weight pair and multiple candidate weights associated with unequal weight pairs. The BCW coding tool is disabled when the selected weight for the current block is associated with the equal weight pair, and the BDOF coding tool is enabled to refine the samples of the List 0 and List 1 predictors when the BCW coding tool is disabled. In some other cases when the selected weight for the current block is associated with an unequal weight pair, the BCW coding tool is enabled and the BDOF coding tool is disabled.

In an embodiment of enabling only one of the BCW and BDOF coding tools, the candidate weight associated with the equal weight pair is evaluated first, and if a best mode of the equal weight pair in an AMVP mode test is not an affine inter mode, testing of affine inter modes is skipped during evaluation of the candidate weights associated with the unequal weight pairs.

The weight for the current block may be selected depending on information related to picture distances between the current and reference pictures, a QP, or a temporal layer ID. In some embodiments of applying the BDOF coding tool to the current block, one or both of a range of gradient sum and a range of a difference between List 0 and List 1 interpolated pixels are right shifted in a predefined bitdepth. One or both of the range of gradient sum and the range of the difference between List 0 and List 1 interpolated pixels are limited by clipping before or after right shifting.

Aspects of the disclosure further provide embodiments of apparatuses for processing video data in a video coding system. An embodiment of the apparatuses comprises one or more electronic circuits configured for receiving input data of a current block in a current picture, determining a List 0 predictor and a List 1 predictor for the current block by performing motion compensation, selecting a weight set from multiple weight sets, selecting a weight from the selected weight set for the current block, computing a final inter predictor by weighted averaging the List 0 and List 1 predictors using a weight pair associated with the selected weight for the current block, and encoding or decoding the current block according to the final inter predictor of the current block. Each weight set is composed of multiple candidate weights, and at least one candidate weight in one of the weight sets is not in another weight set. In another embodiment of the apparatuses, only one of BCW and BDOF coding tools is enabled for computing a final inter predictor for each bi-directional predicted block.

Aspects of the disclosure further provide a non-transitory computer readable medium storing program instructions for causing a processing circuit of an apparatus to perform a video processing method to encode or decode a current block utilizing a weight selected from one of multiple weight sets for blending a List 0 predictor and a List 1 predictor. The weight set may be selected according to video information related to low delay or non-low delay video picture or a flag indicating if a MVD of List 1 is equal to zero.

Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 5:
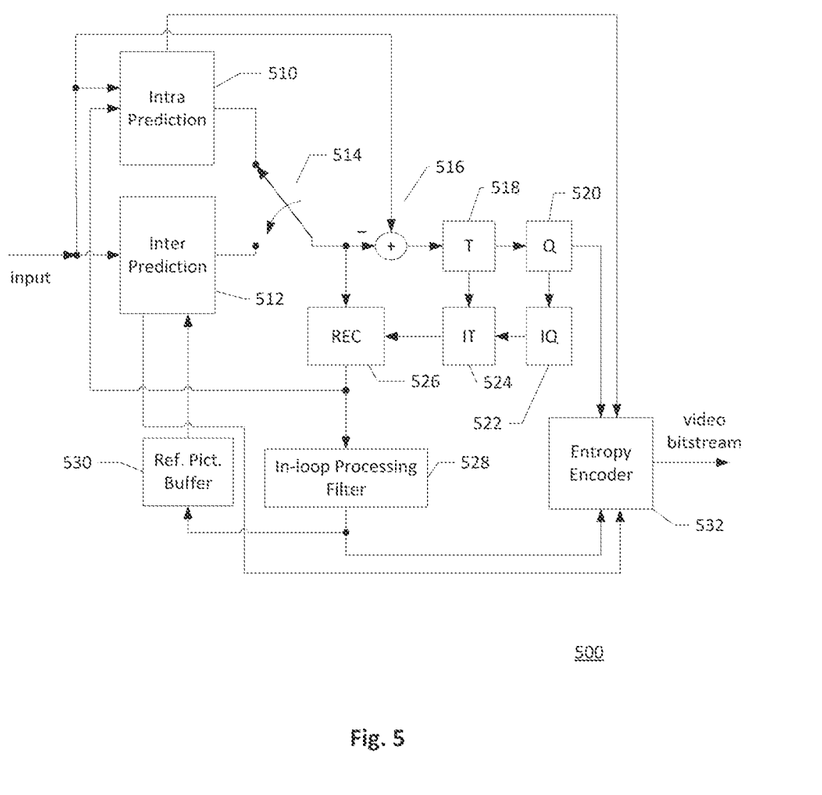
FIG. 5 illustrates an exemplary system block diagram for a video encoding system incorporating the video processing method according to embodiments of the present invention.
Figure 6:
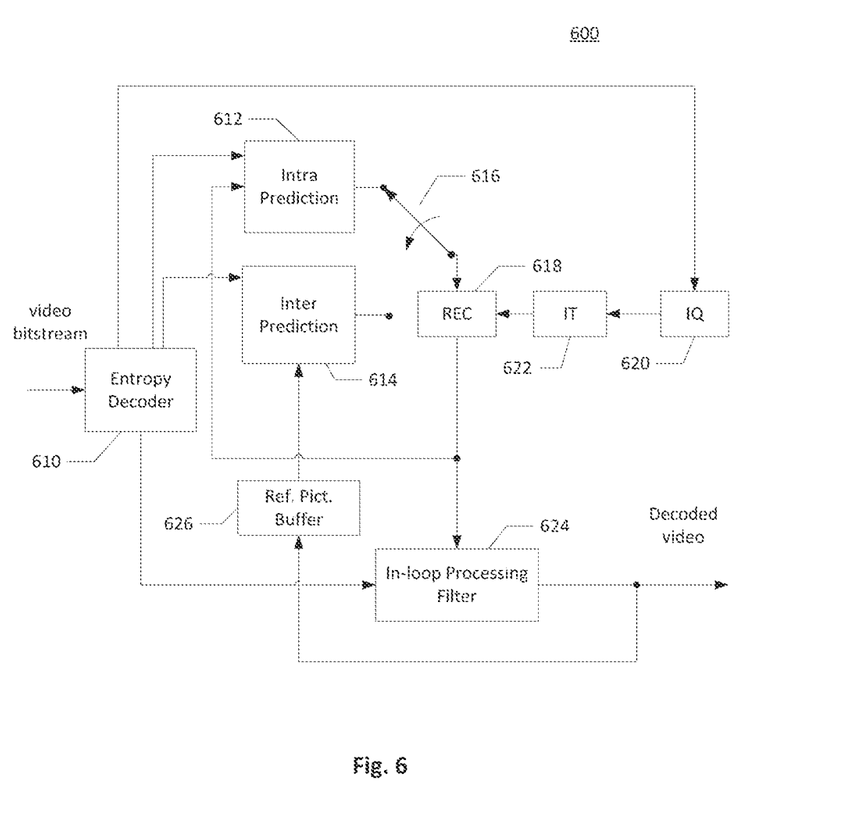
FIG. 6 illustrates an exemplary system block diagram for a video decoding system incorporating the video processing method according to embodiments of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. In this disclosure, systems and methods are described for processing a bi-direction predicted block with a BCW coding tool, and each or a combination of the methods may be implemented in a video encoder or video decoder. An exemplary video encoder and decoder implementing one or a combination of the methods are illustrated in FIGS. 5 and 6 respectively. Various embodiments in the disclosure increase the compression efficiency and/or reduce the computation complexity. Systems and methods described herein are organized in sections as follows. The section "Multiple Predefined Weight Sets for BCW" demonstrates exemplary methods of employing more than one weight set in BCW for processing bi-directional predicted blocks. The section "Non-equal-one Blending gain" describes an exemplary embodiment of allowing a blending gain of a weight pair not equal to 1. The section "Pre-selection of Weight Pair at the Encoder" describes an exemplary method of employing a pre-selection process to skip evaluating one or more candidate weights in the weight set. The section "Interaction between BCW and BDOF" describes various exemplary methods of implementing the BCW and BDOF coding tools in bi-directional prediction. The section "Early Termination of Affine Inter Mode" illustrates an exemplary embodiment of early termination of affine inter mode during evaluation of unequal weight pairs for a bi-directional predicted block. The section "Parameter Derivation and Signaling for Uni-prediction" describes exemplary embodiments of selecting parameters of LIC from multiple pre-defined parameter sets. The sections "Shift the Range of Gradient Sum and/or the Pixels Difference in BDOF" and "Limit and Shift the Range of Gradient Sum and/or Limit and Shift the Pixel Difference in BDOF" describe some examples of reducing the multiplier size required for the BDOF coding tool. The section "Video Encoder and Decoder Implementation" together with FIGS. 5 and 6 illustrate a video encoding system and a video decoding system incorporating one or a combination of the described video processing methods.

In order to improve the coding performance of the BCW or BDOF coding tool, or reduce the required bitdepth or computational complexity of BDOF, various video processing methods are presented in the following paragraphs.

Multiple Predefined Weight Sets for BCW Bi-prediction with CU weights (BCW), also known as Generalized Bi-prediction (GBi), is a technique allowing different weights for blending a List 0 reference block and a weighted List 1 reference block for predicting a current block when the current block is coded or to be coded in bi-directional prediction. In the conventional BCW coding tool, only one predefined weight set is used for all bi-directional predicted blocks. A weight pair is determined for each bi-directional predicted block by selecting one weight from the same weight set. Exemplary embodiments of the present invention employ two or more predefined weight sets in the BCW coding tool. Each weight set is composed of predetermined candidate weights, and at least one candidate weight in one weight set is not in another weight set. The number of weights or offsets in each weight set may be different. For example, one weight set is composed of five candidate weights while another weight set is composed of seven candidate weights. The selection among multiple weight sets is implicitly determined based on video information in some embodiments of the present invention. For example, the weight set used in BCW for coding a current block in a current picture may be implicitly selected depending on the temporal layer ID, Picture of Order Counts (POC) difference between the current and reference pictures, or whether the current video is low delay or non-low delay. In some other embodiments, the selection of weight set may be more adaptively determined at block-level or CU-level depending on the Quantization Parameter (QP), CU size, CTU size, or the value of a flag mvd_l1_zero_flag, where mvd_l1_zero_flag indicates whether the Motion Vector Difference (MVD) of List 1 is equal to zero. In yet another embodiment, the weight set used in BCW is adaptively determined at the encoder side and then explicitly signaled to the decoder side, such that the decoder side can parse the weight set from the video bitstream.

In an embodiment of selecting a weight set from two weight sets according to the value of mvd_l1_zero_flag, if mvd_l1_zero_flag of a current block is equal to zero, which means there is a non-zero MVD in List 1, a first weight set $\{-1/4, 3/8, 1/2, 5/8, 5/4\}$ is employed, otherwise a second weight set $\{11/8, 3/4, 1/2, 5/8, 5/4\}$ is employed to encode or decode the current block. Only the first two candidate weights in the two weight sets are different in this embodiment, the rest candidate weights are all the same. One of the predefined weight sets is used to derive one of the weights $w_0$ and $w_1$, for example, weight $w_1$ is selected from the predefined weight set while weight $w_0$ is derived from weight $w_1$, and in this example, weight $w_0$ is computed by one minus weight $w_1$. The two weight sets include weights for the List 1 predictor in this example, so the corresponding weight set for $w_0$ is $\{5/4, 5/8, 1/2, 3/8, -1/4\}$ when the first weight set $\{-1/4, 3/8, 1/2, 5/8, 5/4\}$ is employed or $\{-3/8, 1/4, 1/2, 3/8, -1/4\}$ when the second weight set $\{11/8, 3/4, 1/2, 5/8, 5/4\}$ is employed.

In a preferred embodiment, the video encoder or decoder determines a weight set for one of weights $w_0$ and $w_1$ among two weight sets according to whether the current video is low delay video or non-low delay video. For example, a first weight set $\{-1/4, 3/8, 1/2, 5/8, 5/4\}$ is selected for low delay video and the second weight set $\{3/8, 1/2, 5/8\}$ is selected for non-low delay video, and since the blending gain of the two weights $w_1$ and $w_0$ is fixed to 1, corresponding weight sets are $\{5/4, 5/8, 1/2, 3/8, -1/4\}$ and $\{5/8, 1/2, 3/8\}$. That is, if the two weight sets are for weight $w_1$, the two corresponding weight sets are for weight $w_0$. The first weight set in this example has five candidate weights, so bi-directional predicted blocks in low delay video have more choices of weights in BCW than bi-directional predicted blocks in non-low delay video. The second weight set only has three candidate weights, and one candidate weight (i.e. $1/2$) corresponds to an equal weight pair while two candidate weights (i.e. $3/8$ and $5/8$) correspond to two unequal weight pairs. For each bi-directional predicted block, a weight set is first selected depending on whether the block is in a low delay video picture, and an index is determined to select a candidate weight from the selected weight set. The index is either explicitly signaled or implicitly determined, for example, the index is inherited from a selected Merge candidate if the bi-directional predicted block is coded or to be coded in Merge or Skip mode, and the index is signaled at the CU level if the bi-directional predicted block is coded or to be coded in AMVP mode, such that a decoder can parse the index at the CU level.

In an implementation example, the final BCW predictor of a bi-directional predicted block is calculated by Equation 9, where $P_0$ is the List 0 predictor, $P_1$ is the List 1 predictor, and w is a weight selected from one of multiple predefined weight sets for the List 1 predictor. The two weighted predictors and an offset value are added up and then shifted by 3 bits, where shifting 3 bits is equivalent to dividing by eight. Some examples of the predefined weight sets for weight w are $\{-2, 3, 4, 5, 10\}$ and $\{3, 4\ 5\}$.

$$\text{BCW predictor} = ((8-w)*P_0 + w*P_1 + \text{offset}) >> 3 \qquad \text{Equation 9}$$

Figure 3:
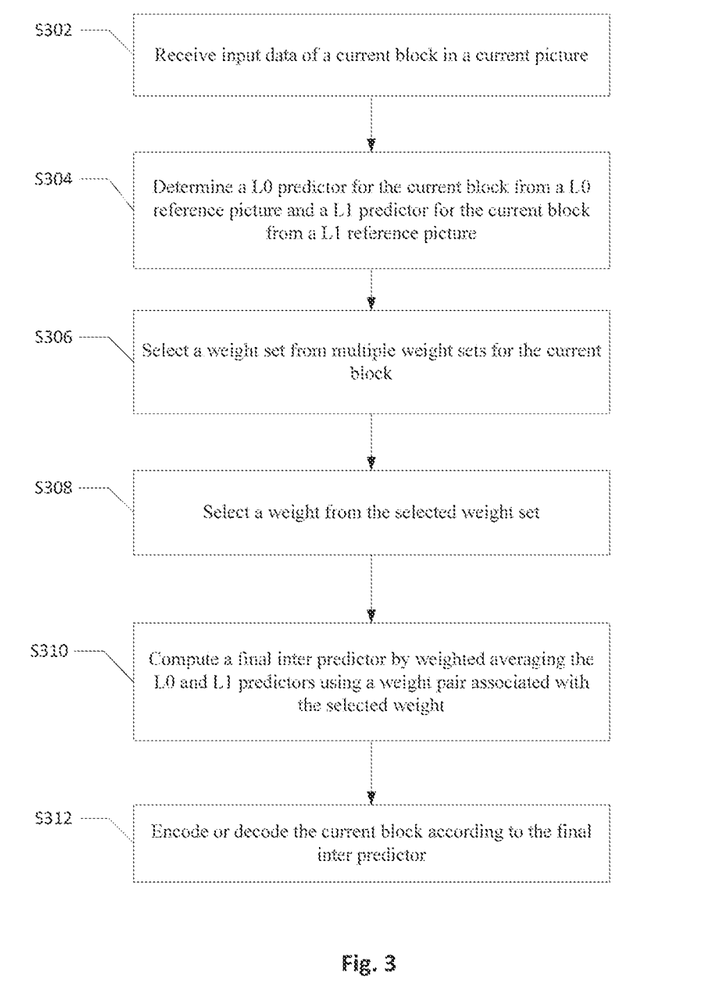
FIG. 3 is a flowchart showing an exemplary embodiment of the present invention for processing a current block by bi-directional prediction.

FIG. 3 shows a flowchart illustrating a video processing method coding a current block by bi-directional prediction according to embodiments of the present invention. A video encoding system or a video decoding system receives input data of a current block in step S302, and the current block is to be coded by bi-directional prediction in the video encoding system or the current block is coded by bi-directional prediction in the video decoding system. In step S304, a List 0 (L0) predictor for the current block is determined by performing motion compensation from a L0 reference picture and a List 1 (L1) predictor for the current block is determined by performing motion compensation from a L1 reference picture based on motion information of the current block. There are two or more weight sets available for weighted averaging the L0 and L1 predictors, and the video encoding system or video decoding system selects one weight set from the multiple weight sets for processing the current block in step S306. Each weight set is composed of multiple candidate weights, for example, one candidate weight is associated with an equal weight pair and remaining candidate weights are associated with unequal weight pairs. Each of the equal and unequal weight pairs is for weighted averaging the L0 and L1 predictors. A weight is selected from the selected weight set for the current block in step S308, and a final inter predictor is computed by weighted averaging the L0 and L1 predictors in step S310 using the weight pair associated with the selected weight. The video encoding or decoding system encodes or decodes the current block according to the final inter predictor in step S312. The processing order of coding a block by bi-directional prediction may be different from the processing order shown in the flowchart of FIG. 3, for example, step S306 of selecting a weight set from multiple weight sets may be performed before steps S302 and S304 as the weight set may be selected for the entire slice, picture, or sequence of video data.

Non-equal-one Blending Gain In some embodiments, the sum of weight $w_0$ for the List 0 predictor and weight $w_1$ for the List 1 predictor is not necessary to be 1 as described in the previous embodiments, that is the blending gain of the weight pair is not fixed to 1. A weight pair having weights added up to one is called an equal-one set and a weight pair having weights not added up to one is called a non-equal-one set. A weight set for $w_0$ or $w_1$ may contain one or more weights associated with an equal-one set and one or more weights associated with a non-equal-one set. For example, a weight set for $w_1$ is $\{-\frac{1}{4}, \frac{3}{8}, \frac{1}{2}, \frac{5}{8}, \frac{5}{4}\}$, and the corresponding weight set for $w_0$ is designed as $\{\frac{7}{4}, \frac{5}{8}, \frac{1}{2}, \frac{3}{8}, -\frac{2}{4}\}$, so the first and last candidate weights are non-equal-one sets while the rest of the candidate weights are equal-one sets.

In an embodiment, the method of allowing non-equal-one blending gain is implemented in conjunction with the method of employing multiple weight sets, for example, a first weight set contains only equal-one sets and a second weight set contains both equal-one and non-equal-one sets, and the first and second weight sets may be adaptively selected based on information such as the value of mvd_l1_zero_flag, low-delay or non-low-delay video, CU size, QP, temporal layer ID at slice level or CU level. For example, the first weight set with all candidate weights associated with equal-one sets is selected if mvd_l1_zero_flag is equal to zero, that is the blending gain of each candidate weight in the first weight set and its corresponding weight is equal to one. If mvd_l1_zero-flag is equal to one, the second weight set containing candidate weights associated with both equal-one and non-equal-one sets is selected. An example of the first weight set for weight $w_1$ is $\{-\frac{1}{4}, \frac{3}{8}, \frac{1}{2}, \frac{5}{8}, \frac{5}{4}\}$, and the corresponding weight set for weight $w_0$ is $\{\frac{5}{4}, \frac{5}{8}, \frac{1}{2}, \frac{3}{8}, -\frac{1}{4}\}$; an example of the second weight set for weight $w_1$ is $\{-\frac{1}{4}, \frac{3}{8}, \frac{1}{2}, \frac{5}{8}, \frac{5}{4}\}$, and the corresponding weight set for weight $w_0$ is $\{\frac{7}{4}, \frac{5}{8}, \frac{1}{2}, \frac{3}{8}, -\frac{2}{4}\}$. Even though the five candidate weights in both the first and second weight sets are all the same, some of the corresponding weights for weight $w_0$ are different. In another example, a first weight set $\{-\frac{1}{4}, \frac{3}{8}, \frac{1}{2}, \frac{5}{8}, \frac{5}{4}\}$ for weight $w_1$ is selected for bi-directional predicted blocks in low delay pictures, and the corresponding weight set for weight $w_0$ is $\{\frac{5}{4}, \frac{5}{8}, \frac{1}{2}, \frac{3}{8}, -\frac{1}{4}\}$; and a second weight set $\{1\frac{1}{8}, \frac{3}{4}, \frac{1}{2}, \frac{5}{8}, \frac{5}{4}\}$ for weight $w_1$ is selected for bi-directional predicted blocks in non-low delay pictures, and the corresponding weight set for weight $w_0$ is $\{-\frac{3}{8}, \frac{3}{8}, \frac{1}{2}, \frac{1}{4}, -\frac{1}{4}\}$.

Pre-selection of Weight Pair at the Encoder Some embodiments of the present invention reduce the computational complexity and encoding runtime by performing a weight pre-selection process for BCW under some predefined conditions. Evaluation of one or more candidate weights included in a weight set may be skipped and remaining candidate weights in the weight set are called the pre-selected weights. The weight for the current block is selected from the pre-selected weights according to evaluation results. In an embodiment, the encoder first performs an equal weight test to evaluate encoding a current block in a low delay picture by bi-directional prediction using equal weights for List 0 and List 1 predictors. In this embodiment, one or more weights in the weight set are skipped for evaluation according to POC differences between the current picture and each of the reference pictures in the equal weight test. For example, a POC difference (diffP0) between the List 0 reference picture selected in the equal weight test and the current picture is compared with a POC difference (diffP1) between the List 1 reference picture selected in the equal weight test and the current picture, and at least one candidate weight in the weight set may be skipped for evaluation according to the comparison result. An example of the weight set is $\{-\frac{1}{4}, \frac{3}{8}, \frac{1}{2}, \frac{5}{8}, \frac{5}{4}\}$ for weight $w_0$, and evaluation of the weight pair $w_0=\frac{5}{4}$ and $w_1=-\frac{1}{4}$ is skipped if the value of diffP0 is larger than diffP1, similarly, evaluation of the weight pair $w_0=-\frac{1}{4}$ and $w_1=\frac{5}{4}$ is skipped if the value of diffP1 is larger than diffP0. In another example, evaluation of one or more preset candidate weights are skipped if both diffP0 and diffP1 are larger than a threshold, and in yet another example, evaluation of one or more preset candidate weights is skipped if one of diffP0 and diffP1 is larger than a threshold.

In one embodiment of weight pre-selection, signaling of the index for indicating the selected weight in the weight set is adaptively adjusted to be more efficient when at least one candidate weight is skipped for evaluation, such that a decoder can parse this adjusted index. For example, the original weight set is $\{\frac{5}{4}, \frac{5}{8}, \frac{1}{2}, \frac{3}{8}, -\frac{1}{4}\}$, the codeword used to signal the first candidate weight ($w=\frac{5}{4}$) is 001, and the codeword used to signal the fifth candidate weight ($w=-\frac{1}{4}$) is 0001. In the case when the first candidate weight in the weight set is skipped for evaluation at the encoder due to a predefined condition, the codeword for the fifth candidate weight is changed to 001 to increase the coding gain. The corresponding decoder determines the selected weight is the fifth candidate weight ($w=-\frac{1}{4}$) when the predefined condition is met and the codeword of the index is 001.

Interaction Between BCW and BDOF Both BCW and BDOF are coding tools aiming to enhance the compression performance in bi-direction prediction. BCW offers the flexibility to apply different weights for blending the List 0 and List 1 predictors to generate a final inter predictor of a bi-directional predicted block. BDOF refines samples of the List 0 and List 1 predictors based on the theory of optical flow. When BDOF is applied to the current block, the video coding system modifies the motion vector on a per-pixel basis for the current block. That is, rather than retrieving each pixel of the reference block as a block unit, according to BDOF, the video coding system determines per-pixel modifications to the motion vector for the current block, and constructs the reference block such that the reference block includes reference pixels identified by the motion vector and the per-pixel modification for the corresponding pixel of the current block.

In some embodiments of the present invention, only one of the BCW and BDOF coding tools is enabled at a time to avoid the performance affected by the other tool and to save the runtime. In some cases, a difference between the current picture and the reference picture from List 0 and a difference between the current picture and the reference picture from List 1 are quite different, so the assumption of equal movement for local motion vectors from List 0 and List 1 in BDOF is incorrect. Unequal weighting for blending the List 0 and List 1 predictors may be helpful in these cases by assigning a larger weight to the list with a smaller difference between the current picture and the reference picture. Alternatively, when the difference between the current picture and the reference picture from List 0 and the difference between the current picture and the reference picture from List 1 are equal, the assumption of equal movement for local motion vectors from List 0 and List 1 in BDOF may be more precise, and BCW may be disabled as equal weighting for blending the predictors is more likely to be selected in this case.

In BCW, a weight set is typically composed of one candidate weight associated with an equal weight pair and multiple candidate weights associated with unequal weight pairs. The encoder may select a best candidate weight from the weight set by systematically testing each of the candidate weights. In an embodiment of encoding or decoding a bi-directional predicted block, the BDOF coding tool is disabled if a candidate weight associated with an unequal weight pair is selected for the BCW coding tool, and the BDOF coding tool is enabled only if a candidate weight associated with the equal weight pair is selected for the BCW coding tool. When the candidate weight associated with the equal weight pair is selected for blending the List 0 and List 1 predictors, it is equivalent as disabling the BCW coding tool because the conventional bi-directional predictor is generated by blending the List 0 and List 1 predictors with equal weights. In other words, the BCW coding tool is disabled when the BDOF coding tool is enabled. In this case, using the equal weights for blending the List 0 and List 1 predictors somehow satisfies the assumption of equal offsets of local motion vectors for List 0 and List 1 in BDOF.

Figure 4:
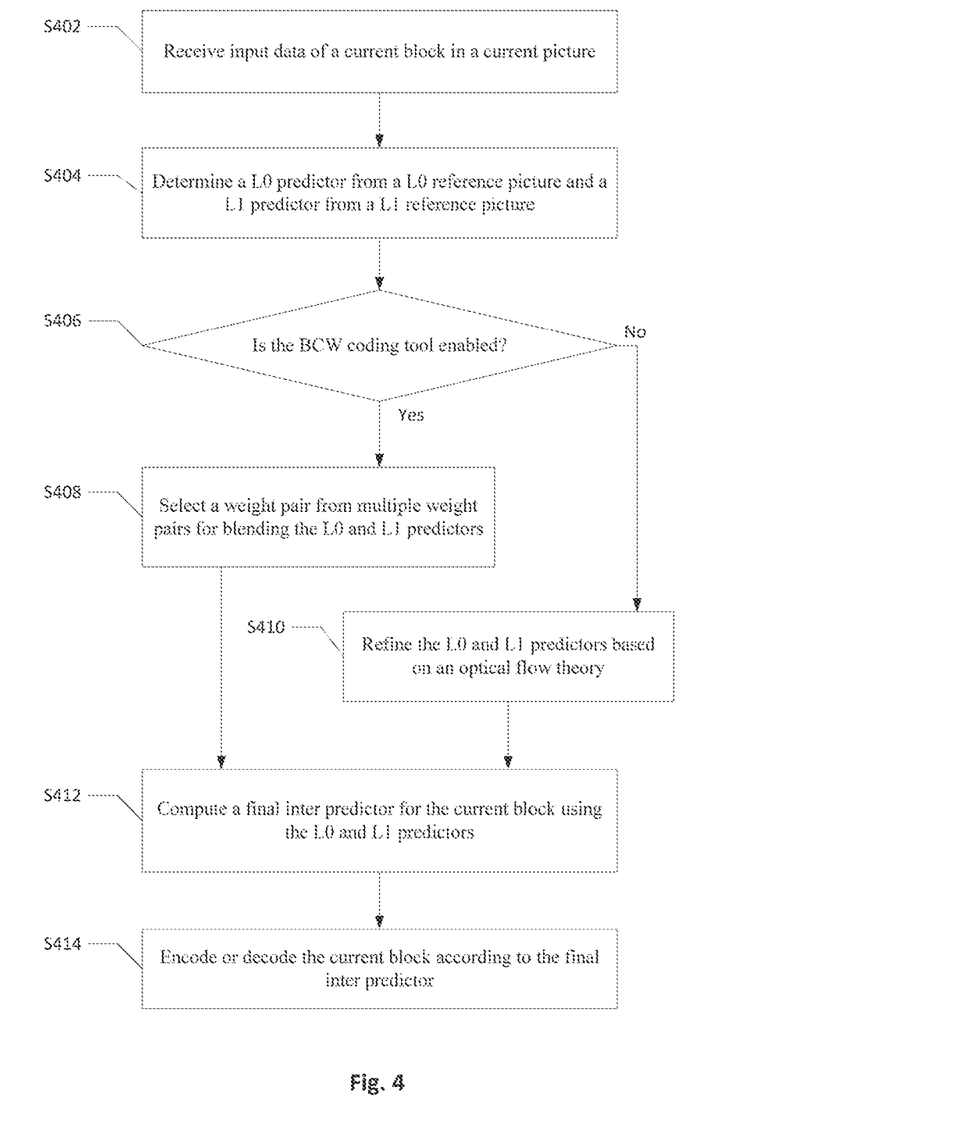
FIG. 4 is a flowchart showing another exemplary embodiment of the present invention for processing a current block by bi-directional prediction.

FIG. 4 shows a flowchart illustrating a video coding method for processing a current block by bi-directional prediction according to an embodiment of the present invention. A video encoding or decoding system receives input data of the current block in step S402, and determines a L0 predictor for the current block by performing motion compensation from a L0 reference picture and a L1 predictor for the current block by performing motion compensation from a L1 reference picture according to motion information of the current block in step S404. At the video encoder side, the input data corresponds to pixel data to be encoded, whereas at the video decoder side, the input data corresponds to coded data or prediction residual to be decoded. Only one of BCW and BDOF coding tools is applied to the current block in this embodiment, so step S406 checks if the BCW coding tool is enabled. If the BCW coding tool is enabled, step S408 selects a weight pair from multiple weight pairs for blending the L0 and L1 predictors. If the BCW coding tool is disabled, the BDOF coding tool is enabled to refine the L0 and L1 predictors based on an optical flow theory in step S410, where the L0 and L1 predictors are combined by an equal weighting weight pair. The video encoding or decoding system computes a final inter predictor for the current block using the L0 and L1 predictors in step S412, and encodes or decodes the current block according to the final inter predictor in step S414. In this embodiment shown in FIG. 4, the BDOF coding tool is enabled depending on whether the BCW coding tool is enabled or disabled, in another embodiment, the BCW coding tool is enabled depending on whether the BDOF coding tool is enabled or disabled.

Some other embodiments still allow enabling both the BCW and BDOF coding tools at the same time, but alter one or more settings in the BCW coding tool when the BDOF coding tool is enabled. In one embodiment, the weight selection in BCW is limited when the BDOF coding tool is enabled, for example, only a number of candidate weights in a weight set can be used when the BDOF coding tool is enabled. In other words, one or more of the supported weights in BCW when the BDOF coding tool is disabled are not supported in BCW when the BDOF coding tool is enabled. The supported weights in BCW when enabling the BDOF coding tool may be predefined or explicitly signaled to the decoder.

More generally, the number of supported weights in BCW when the BDOF coding tool is enabled is different from the number of supported weights in BCW when the BDOF coding tool is disabled, or at least one supported weight in BCW when the BDOF coding tool is disabled is not supported in BCW when the BDOF coding tool is enabled. An embodiment of employing multiple weight sets in BCW selects one weight set when the BDOF coding tool is enabled and selects another weight set when the BDOF coding tool is disabled. The two weight sets may contain same or different numbers of candidate weights.

The weight selection in BCW may be further depending on information related to the picture distances such as the POC, QP, temporal layer ID, or any combination of these factors. For example, a current block in a current picture is predicted from a reference picture from List 0 and a reference picture from List 1, the POC of the reference picture from List 0, the POC of the current picture, and the POC of the reference picture from List 1 is 1, 2, and 7 respectively. The difference of POCs between the current picture and the reference picture from List 0 (diff_POC0) is 1 and the difference of POCs between the current picture and the reference picture from List 1 (diff_POC1) is 5. In one embodiment, the difference between diff_POC0 and diff_POC1 is compared with a predefined threshold, and if this difference is greater than the predefined threshold, only selected weights can be used in BCW when BDOF is enabled. In this example, the difference between diff_POC0 and diff_POC1 is 4, and the encoder only needs to test the selected weights in BCW instead of all the weights in the weight set if this difference is greater than the predefined threshold.

Early Termination of Affine Inter Mode As previously described, a weight set in BCW typically includes one candidate weight associated with an equal weight pair and multiple candidate weights associated with unequal weight pairs. The encoder selects a best candidate weight by systematically evaluating each of the candidate weights in the weight set. In some embodiments, the encoder evaluates the candidate weight associated with the equal weight pair first, followed by the candidate weights associated with the unequal weight pairs. An embodiment of the present invention skips testing affine inter modes during evaluation of the candidate weights associated with the unequal weight pairs if the best mode of the equal weight pair in the Advanced Motion Vector Prediction (AMVP) mode test is not an affine inter mode.

Parameter Derivation and Signaling for Uni-prediction A linear model with a scaling factor a and an offset b is used for Local Illumination Compensation (LIC), where the scaling factor and the offset are derived by referring to neighboring samples of a current block and a reference block at both the encoder and decoder sides. However, accessing neighboring samples of the current and reference blocks results in hardware pipeline delay issue. To solve this delay issue at the decoder side, an embodiment of the LIC parameter derivation selects a best LIC parameter set out of multiple predefined LIC parameter sets at the encoder, and an index of the selected parameter set is explicitly signaled to the decoder, so that the index can be parsed by the decoder to recover the selected parameter set. This encoder-derived LIC parameter method may be applied for uni-prediction at CU-level, CTU-level, or slice-level. The size of the CU can be constrained to only allow CUs with particular sizes to employ the encoder-derived LIC parameter method, for example, the encoder-derived LIC parameter method is only applied to uni-predicted CUs when the area, width, or height of the CU is larger than a certain threshold, or smaller than a certain threshold. The threshold may be implicitly set by default or explicitly determined by information such as QP, temporal layer ID, statistical results related to some factors like luminance at slice level, non-low delay case, or the value of mvd_l1_zero_flag. Under the CU size constraints, the encoder-derived LIC parameter method may be disabled without any signaling. The CU size constraints may be applied to the BCW coding tool. In an embodiment of encoding non-low delay pictures, under the CU size constraints, BCW may be disabled without any signaling when the area, width, or height of the CU is larger than a certain threshold, or smaller than a certain threshold.

Shift the Range of Gradient Sum and/or the Pixels Difference in BDOF An embodiment of implementing BDOF shifts the range of gradient sum in a predefined bitdepth. For example, the range of gradient sum is right shift by 4 bits, so the multipliers required for calculating the parameters can be reduced from 12 bits by 12 bits to 8 bits by 8 bits and from 12 bits by 15 bits to 8 bits by 15 bits. Another embodiment right shifts the range of the difference between List 0 and List 1 interpolated pixels, for example, the range of the difference between List 0 and List 1 interpolated pixels is right shifted by 4 bits so the multiplier can be reduced to 12 bits by 12 bits and 12 bits by 11 bits. The two embodiments described above may be implemented together so both the range of gradient sum and the difference between List 0 and List 1 interpolated pixels are shifted. For example, both the gradient sum and the range of the difference between List 0 and List 1 interpolated pixels are right shifted by 4 bits, so the multipliers are reduced to 8 bits by 8 bits and 8 bits by 11 bits. In another example, the gradient sum is right shifted by 4 bits and the difference between List 0 and List 1 interpolated pixels is right shifted by 7 bits. In this way, only 8 bits by 8 bits multipliers are required for calculating the parameters in BDOF. The shifting number for the gradient sum or the difference between List 0 and List 1 can be implicitly predefined values, depending on the input bitdepth, or explicitly signaled to the decoder to be parsed at a sequence level, picture level, or slice level.

Limit and Shift the Range of Gradient Sum and/or Limit and Shift the Pixel Difference in BDOF An embodiment of implementing BDOF limits the range of gradient sum in a predefined bitdepth by clipping and then shift the limited range of gradient sum. The order of the clipping operation and the shift operation may be switched. The clipping number or the shifting number can be set to an arbitrary number according to the requirement of applications. For example, the range of gradient sum is limited to 10 bits and then the range of gradient is right shifted by 2 bits. The multipliers used to calculate the parameters are reduced to 8 bits by 8 bits and 8 bits by 15 bits. In another embodiment, the range of the difference between List 0 and List 1 is clipped to 12 bits and then the resulted value is right shifted by 1 bit. The multipliers are reduced to 12 bits by 12 bits and 12 bits by 11 bits. In one embodiment, both the gradient sum and the difference between List 0 and List 1 interpolated pixels are limited and shifted in BDOF, for example, the range of gradient sum is clipped to 10 bits and then right shifted by 2 bits, and the difference between the List 0 and List 1 interpolated pixels is clipped to 12 bits then right shifted by 1 bit. The multipliers are reduced to 8 bits by 8 bits and 8 bits by 11 bits. Moreover, all of the parameters $S_1$, $S_2$, $S_3$, $S_5$, and $S_6$ can be represented in 32 bits. More examples for the combination of the limit range operation and shift operation for gradient sum and the difference between List 0 and List 1 interpolated pixels are shown in Table 1. The limited range and shift number for the range of gradient sum or the difference between List 0 and List 1 can be implicitly predefined values, dependent on the input bitdepth, or explicitly signaled to the decoder to be parsed at a sequence level, picture level, or slice level.

TABLE 1

| | Limited range for gradient sum | Shifting number for gradient sum | Limited range for the difference between List 0 and List 1 | Shifting number for the difference between List 0 and List 1 | Number of bits for multiplication | Number of bits to represent $S_1$, $S_2$, $S_3$, $S_5$ and $S_6$ |
|---|---|---|---|---|---|---|
| Example 1 | 10 | 2 | 12 | 1 | 8 bits by 8 bits and 8 bits by 11 bits | All 32 bits |
| Example 2 | 10 | 3 | 12 | 1 | 7 bits by 7 bits and 7 bits by 11 bits | All 32 bits |
| Example 3 | 10 | 3 | 12 | 2 | 7 bits by 7 bits and 7 bits by 10 bits | All 32 bits |
| Example 4 | 10 | 3 | 12 | 3 | 7 bits by 7 bits and 7 bits by 9 bits | All 32 bits |
| Example 5 | 10 | 4 | 12 | 5 | 6 bits by 6 bits and 6 bits by 7 bits | All 32 bits |
| Example 6 | 10 | 4 | 12 | 7 | 6 bits by 6 bits and 6 bits by 5 bits | All 32 bits |

Video Encoder and Decoder Implementations The foregoing proposed video coding methods can be implemented in video encoders or decoders. For example, a proposed video coding method is implemented in a predictor derivation module of an encoder, and/or predictor derivation module of a decoder. In another example, a proposed video processing method is implemented in a motion compensation module of an encoder, and/or a motion compensation module of a decoder. Alternatively, any of the proposed methods is implemented as a circuit coupled to the predictor derivation or motion compensation module of the encoder and/or the predictor derivation module or motion compensation module of the decoder, so as to provide the information needed by the predictor derivation module or the motion compensation module.

FIG. 5 illustrates an exemplary system block diagram for a Video Encoder 500 implementing various embodiments of the present invention. Intra Prediction module 510 provides intra predictors based on reconstructed video data of a current picture. Inter Prediction module 512 performs motion estimation (ME) and motion compensation (MC) to provide inter predictors based on video data from other picture or pictures. To encode a current block by bi-directional prediction according to some embodiments of the present invention, one out of multiple weight sets is used, and a weight is selected for the current block from this weight set. Each of the weight sets is composed of multiple candidate weights, and each candidate weight is associated with a weight pair. Inter Prediction module 512 first determines a List 0 predictor by performing motion estimation and motion compensation from a List 0 reference picture and a List 1 predictor by performing motion estimation and motion compensation from a List 1 reference picture, and then computes a final inter predictors for the current block by weighted averaging the List 0 and List 1 predictors of the current block using a weight pair associated with the selected weight. In some other embodiments, the Inter Prediction module 512 enables only one of BCW and BDOF coding tools for generating a final inter predictor for each bi-directional predicted block. For example, the BDOF coding tool is disabled when the BCW coding tool is enabled by applying different weights for blending the List 0 and List 1 predictors of the current block, and the BDOF coding tool is enabled to refine the List 0 and List 1 predictors of the current block when an equal weight pair is used for blending the List 0 and List 1 predictors. Either Intra Prediction module 510 or Inter Prediction module 512 supplies the selected predictor to Adder 516 to form prediction errors, also called prediction residual. The prediction residual of the current block are further processed by Transformation module (T) 518 followed by Quantization module (Q) 520. The transformed and quantized residual signal is then encoded by Entropy Encoder 532 to form a video bitstream. The video bitstream is then packed with side information. The transformed and quantized residual signal of the current block is processed by Inverse Quantization module (IQ) 522 and Inverse Transformation module (IT) 524 to recover the prediction residual. As shown in FIG. 5, the prediction residual is recovered by adding back to the selected predictor at Reconstruction module (REC) 526 to produce reconstructed video data. The reconstructed video data may be stored in Reference Picture Buffer (Ref. Pict. Buffer) 530 and used for prediction of other pictures. The reconstructed video data recovered from REC 526 may be subject to various impairments due to encoding processing; consequently, In-loop Processing Filter 528 is applied to the reconstructed video data before storing in the Reference Picture Buffer 530 to further enhance picture quality.

A corresponding Video Decoder 600 for decoding the video bitstream generated from the Video Encoder 500 of FIG. 5 is shown in FIG. 6. The video bitstream is the input to Video Decoder 600 and is decoded by Entropy Decoder 610 to parse and recover the transformed and quantized residual signal and other system information. The decoding process of Decoder 600 is similar to the reconstruction loop at Encoder 500, except Decoder 600 only requires motion compensation prediction in Inter Prediction module 614. Each block is decoded by either Intra Prediction module 612 or Inter Prediction module 614. Switch 616 selects an intra predictor from Intra Prediction module 612 or an inter predictor from Inter Prediction 614 according to decoded mode information. Inter Prediction module 614 determines a List 0 predictor by performing motion compensation from a List 0 reference picture and determines a List 1 predictor by performing motion compensation from a List 1 reference picture. Inter Prediction module 614 then generates a final inter predictor of a current block by weighted averaging the List 0 and List 1 predictors using a weight pair according to some exemplary embodiments. The weight pair is derived by a weight selected for the current block from a weight set, and the weight set is selected from multiple weight sets according to video information related to a temporal layer ID, POC difference between the current and reference pictures, low delay or non-low delay video, QP, CU size, CTU size, a flag indicating a MVD of List 1 is equal to zero, or a combination thereof. In some other embodiments, Inter Prediction module 614 generates a final inter predictor for a current block by enabling only one of BCW and BDOF coding tools. The transformed and quantized residual signal associated with each block is recovered by Inverse Quantization module (IQ) 620 and Inverse Transformation module (IT) 622. The recovered residual signal is reconstructed by adding back the predictor in Reconstruction module (REC) 618 to produce reconstructed video. The reconstructed video is further processed by In-loop Processing Filter (Filter) 624 to generate final decoded video. If the currently decoded picture is a reference picture for later pictures in decoding order, the reconstructed video of the currently decoded picture is also stored in Ref. Pict. Buffer 626.

Various components of Video Encoder 500 and Video Decoder 600 in FIG. 5 and FIG. 6 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 500 and Decoder 600, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 5 and 6, Encoder 500 and Decoder 600 may be implemented in the same electronic device, so various functional components of Encoder 500 and Decoder 600 may be shared or reused if implemented in the same electronic device.

Embodiments of the video processing method for encoding or decoding bi-directional predicted blocks may be implemented in a circuit integrated into a video compression chip or program codes integrated into video compression software to perform the processing described above. For examples, selecting a weight set from multiple weight sets for coding a current block may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data by bi-directional prediction in a video coding system, comprising:
receiving input data associated with a current block in a current picture, wherein the current block is coded or to be coded by bi-directional prediction;
determining a List 0 predictor for the current block by performing motion compensation from a reference picture in List 0 and determining a List 1 predictor for the current block by performing motion compensation from a reference picture in List 1;
determining whether Bi-prediction with CU Weight (BCW) is enabled for coding the current block;
in response to the BCW being determined as enabled for coding the current block,
disabling Bi-Directinal Optical Flow (BDOF) for the current block,
selecting a weight set from a plurality of weight sets for the current block, wherein each weight set is composed of a plurality of candidate weights;
selecting a weight from the selected weight set for the current block, and
computing a final inter predictor by weighted averaging the List 0 predictor and the List 1 predictor of the current block using a weight pair associated with the selected weight for the current block; and
encoding or decoding the current block according to the final inter predictor of the current block.

2. The method of claim 1, wherein each weight set of the plurality of weight sets is composed of a different number of candidate weights.

3. The method of claim 1, wherein the weight set for the current block is implicitly selected based on video information related to one or a combination of a temporal layer ID, Picture of Count (POC) difference between the current and reference pictures, low delay or non-low delay video picture, Quantization Parameter (QP), Coding Unit (CU) size, Coding Tree Unit (CTU) size, and at least a flag indicating if a Motion Vector Difference (MVD) of List 1 is equal to zero.

4. The method of claim 3, wherein the plurality of weight sets comprises a first weight set and a second weight set, the first weight set is composed of five candidate weights and the second weight set is composed of three candidate weights, the first weight set is selected for the current block if the current picture is a low delay video picture and the second weight set is selected for the current block if the current picture is a non-low delay video picture.

5. The method of claim 1, wherein a blending gain of a weight pair associated with each candidate weight is fixed to 1, the weight pair includes a weight for the List 0 predictor and a weight for the List 1 predictor, and the weight for the List 1 predictor is the candidate weight and the weight for the List 0 predictor is derived by 1 minus the candidate weight.

6. The method of claim 1, wherein a blending gain of a weight pair associated with each candidate weight is not all fixed to 1, at least one candidate weight in at least one weight set is associated with a weight pair having weights not added up to 1.

7. The method of claim 6, wherein each of the rest candidate weights is associated with a weight pair having weights added up to 1.

8. The method of claim 1, wherein an index is explicitly signaled or parsed to indicate the selected weight for the current block if the current block is coded or to be coded in Advanced Motion Vector Prediction (AMVP) mode, and the selected weight for the current block is inherited from a selected Merge candidate if the current block is coded or to be coded in Merge or Skip mode by inheriting motion information from the selected Merge candidate.

9. The method of claim 1, wherein selecting a weight from the selected weight set for the current block further comprises a pre-selecting process, and the pre-selecting process skips evaluating one or more candidate weights in the selected weight set and only evaluates remaining candidate weights in the selected weight set, wherein the weight is selected from the remaining candidate weights according to evaluation results of the pre-selecting process.

10. The method of claim 9, wherein an index is signaled or parsed to indicate the selected weight in the selected weight set for the current block, and the index is adaptively adjusted if one or more candidate weights in the selected weight set are skipped for evaluation in the pre-selecting process.

11. The method of claim 1, wherein each of the weight sets is composed of one candidate weight associated with an equal weight pair and a plurality of candidate weights associated with unequal weight pairs, and the step of computing the final inter predictor further comprises refining samples in the List 0 and List 1 predictors of the current block based on bi-directional optical flow only if the selected eight is associated with the equal weight pair.

12. A method of processing video data by bi-directional prediction in a video coding system, comprising:
receiving input data associated with a current block in a current picture, wherein the current block is coded or to be coded by bi-directional prediction;
determining a List 0 predictor for the current block by performing motion compensation from a reference picture in List 0 and determining a List 1 predictor for the current block by performing motion compensation from a reference picture in List 1;
computing a final inter predictor of the current block using the List 0 and List 1 predictors by enabling Bi-prediction with CU Weight (BCW) in a case that Bi-Directional Optical Flow (BDOF) is disabled or by enabling the BDOF in a case that the BCW is disabled, wherein different weights for the List 0 and List 1 are allowed for blending the List 0 and List 1 predictors when the BCW coding tool is enabled, and samples of the List 0 and List 1 predictors are refined based on an optical flow theory when the BDOF coding tool is enabled; and
encoding or decoding the current block according to the final inter predictor of the current block.

13. The method of claim 12, further comprising selecting a weight from a weight set for the current block, wherein the weight set is composed of one candidate weight associated with an equal weight pair and a plurality of candidate weights associated with unequal weight pairs, and the final inter predictor is computed by weighted averaging the List 0 and List 1 predictors using a weight pair associated with the selected weight.

14. The method of claim 13, wherein the BCW coding tool is disabled when the selected weight for the current block is associated with the equal weight pair; and the BDOF coding tool is enabled to refine the samples of the List 0 and List 1 predictors when the BCW coding tool is disabled.

15. The method of claim 13, wherein the BDOF coding tool is disabled if the selected weight is associated with an unequal weight pair.

16. The method of claim 13, wherein the candidate weight associated with the equal weight pair is evaluated first, and if a best mode of the equal weight pair in an Advanced Motion Vector Prediction (AMVP) mode test is not an affine inter mode, testing of affine inter modes is skipped during evaluation of the candidate weights associated with the unequal weight pairs.

17. The method of claim 12, wherein the weight for the current block is selected depending on information related to picture distances between the current and reference pictures, a Quantization Parameter (QP), or a temporal layer ID.

18. The method of claim 12, wherein one or both of a range of gradient sum and a range of a difference between List O and List 1 interpolated pixels are right shifted in a predefined bitdepth when the BDOF coding tool is enabled.

19. The method of claim 18, wherein one or both of the range of gradient sum and the range of the difference between List 0 and List 1 interpolated pixels are limited by clipping before or after right shifting.

20. An apparatus of processing video data by bi-directional prediction in a video coding system, the apparatus comprising one or more electronic circuits configured for:
receiving input data associated with a current block in a current picture, wherein the current block is coded or to be coded by bi-directional prediction;
determining a List 0 predictor for the current block by performing motion compensation from a reference picture in List 0 and determining a List 1 predictor for the current block by performing motion compensation from a reference picture in List 1;
determining whether Bi-prediction with CU Weight (BCW) is enabled for coding the current block;
in response to the BCW being determined as enabled for coding the current block,
disabling Bi-Directional Optical Flow (BDOF) for the current block,
selecting a weight set from a plurality of weight sets for the current block, wherein each weight set is composed of a plurality of candidate weights,
selecting a weight from the selected weight set for the current block, and
computing a final inter predictor by weighted averaging the List 0 predictor and the List 1 predictor of the current block using a weight pair associated with the selected weight for the current block; and
encoding or decoding the current block according to the final inter predictor of the current block.

21. A non-transitory computer readable medium storing program instruction causing a processing circuit of an apparatus to perform a bi-directional prediction processing method for video data, and the method comprising:
receiving input data associated with a current block in a current picture, wherein the current block is coded or to be coded by bi-directional prediction;
determining a List 0 predictor for the current block by performing motion compensation from a reference picture in List 0 and determining a List 1 predictor for the current block by performing motion compensation from a reference picture in List 1;
determining whether Bi-prediction with CU Weight (BCW) is enabled for coding the current block;
in response to the BCW being determined as enabled for coding the current block,
disabling Bi-Directional Optical Flow (BDOF) for the current block,
selecting a weight set from a plurality of weight sets for the current block, wherein each weight set is composed of a plurality of candidate weights,
selecting a weight from the selected weight set for the current block, and
computing a final inter predictor by weighted averaging the List 0 predictor and the List 1 predictor of the current block using a weight pair associated with the selected weight for the current block; and
encoding or decoding the current block according to the final inter predictor of the current block.

\* \* \* \* \*